US005841095A

United States Patent [19]

Lu et al.

[11] Patent Number: 5,841,095
[45] Date of Patent: Nov. 24, 1998

[54] APPARATUS AND METHOD FOR IMPROVED ASSEMBLY CONCENTRICITY IN A PLASMA ARC TORCH

[75] Inventors: Zhipeng Lu; Richard W. Couch, Jr.; Jennifer L. Freeman, all of Hanover, N.H.

[73] Assignee: Hypertherm, Inc., Hanover, N.H.

[21] Appl. No.: 736,707

[22] Filed: Oct. 28, 1996

[51] Int. Cl.[6] .......... B23K 10/00

[52] U.S. Cl. .......... 219/121.48; 219/121.52; 219/121.5; 285/316

[58] Field of Search .......... 219/121.48, 121.5, 219/137.42, 137.61, 75, 74, 121.59; 285/25–32, 315, 316, 319

[56] References Cited

U.S. PATENT DOCUMENTS

| | | | |
|---|---|---|---|
| 3,242,305 | 3/1966 | Kane et al. | 219/75 |
| 3,643,580 | 2/1972 | Siegel | 98/40 C |
| 4,567,346 | 1/1986 | Marhic | 219/121 PB |
| 4,647,082 | 3/1987 | Fournier et al. | 285/315 |
| 4,663,512 | 5/1987 | Kneeland et al. | 219/121 PU |
| 4,748,312 | 5/1988 | Hatch et al. | 219/121 PR |
| 5,089,221 | 2/1992 | Johansson et al. | 376/442 |
| 5,105,061 | 4/1992 | Blankenship | 219/121.52 |
| 5,317,126 | 5/1994 | Couch, Jr. et al. | 219/121.51 |
| 5,393,952 | 2/1995 | Yamaguchi et al. | 219/121.5 |
| 5,396,043 | 3/1995 | Couch, Jr. et al. | 219/121.5 |
| 5,468,026 | 11/1995 | Annestedt | 285/133.1 |
| 5,473,140 | 12/1995 | Colling | 219/137.42 |
| 5,624,586 | 4/1997 | Sobr et al. | 219/121.48 |

FOREIGN PATENT DOCUMENTS

| | | |
|---|---|---|
| 2 135 469 A | 12/1972 | France . |
| 274263 | 9/1970 | U.S.S.R. . |
| WO 89/00476 | 1/1989 | WIPO . |

OTHER PUBLICATIONS

Oberg et al.; "Machinery's Handbook"; *Unified Screw Threads;* 24th Edition, pp. cover sheet, 1546, 1550.

*AMP Incorporated;* "High Current Product"; Catalog 65141 (Revised Dec. 1993); pp. 1–12.

*Primary Examiner*—Mark H. Paschall
*Attorney, Agent, or Firm*—Testa, Hurwitz & Thibeault, LLP

[57] ABSTRACT

Disclosed is a method and structure for improving alignment of a plasma arc with an axial centerline of a plasma arc torch. At least one of an electrode and nozzle are mounted in respective bores of a cathode block and torch body using a radial spring element. By concentrically machining the bores along an axial centerline of the torch and centering the consumable components within the bores using the spring elements, an insert disposed in a tip of the electrode is axially aligned with an orifice formed in a tip of the nozzle. Asymmetric wear of the nozzle orifice due to a skewed arc path is markedly reduced or eliminated. The torch may be employed in computer controlled cutting and marking systems to produce components or workpieces with reduced dimensional and angular errors.

14 Claims, 4 Drawing Sheets

APPARATUS AND METHOD FOR IMPROVED ASSEMBLY CONCENTRICITY IN A PLASMA ARC TORCH

TECHNICAL FIELD

The present invention relates to the design and manufacture of plasma arc torches, and more specifically, to a configuration for and method of aligning consumables, such as an electrode and a nozzle, so that an arc is aligned with a longitudinal axis of the torch.

BACKGROUND

Plasma arc torches are widely used in the cutting of metallic materials. A plasma arc torch generally includes a cathode block with an electrode mounted therein, a nozzle with a central exit orifice mounted within a torch body, electrical connections, passages for cooling and arc control fluids, a swirl ring to control fluid flow patterns in the plasma chamber formed between the electrode and nozzle, and a power supply. The torch produces a plasma arc, which is a constricted ionized jet of a plasma gas with high temperature and high momentum. Gases used in the torch can be non-reactive (e.g. argon or nitrogen), or reactive (e.g. oxygen or air).

In operation, a pilot arc is first generated between the electrode (cathode) and the nozzle (anode). Generation of the pilot arc may be by means of a high frequency, high voltage signal coupled to a DC power supply and the torch or any of a variety of contact starting methods.

Plasma arc torches are increasingly used in computer controlled cutting systems where the torch is mounted on a gantry or other positioning system and employed to cut intricately contoured, low tolerance components from sheet stock or other workpieces. Alternatively or additionally, the workpiece may be mounted on a rotary table or other positioning system to facilitate manufacture or provide additional degrees of freedom in the system. The accuracy with which the components are produced is a function of the accuracy and repeatability of the positioning system and the location and angularity of the plasma arc relative to a centerline or other datum of the torch.

Location and angularity of the arc is determined by the relative location of the electrode and nozzle or, more specifically, the location of an insert disposed in a tip of the electrode relative to a centerline of the nozzle orifice. Since the plasma gas flowing through the orifice tends to center the arc in the orifice, it is desirable that the insert is concentrically axially aligned with the orifice, as any misalignment skews the arc relative to the centerline datum of the torch. As used herein, the term "axially concentric" and variants thereof mean that the centerlines of two or more components are substantially collinear. Depending on the direction of cut, this misalignment can result in the production of components with improper dimensions and non-normal edges. Asymmetric wear of the nozzle orifice also typically results.

Tolerances associated with conventional methods of mounting the electrode and nozzle render systems employing such torches incapable of producing highly uniform, close tolerance components due to the errors inherent in positioning the electrode relative to the nozzle. One method of mounting the electrode and nozzle employs close tolerance sliding fits. For example, a cathode block having a bore for receiving a base of the electrode has a nominal diameter of 0.272 inches (0.691 cm) with a machining tolerance band of plus or minus 0.001 inches (0.003 cm). Accordingly, the bore can have a maximum diameter of 0.273 inches (0.693 cm) and a minimum diameter of 0.271 inches (0.688 cm). In order to ensure the electrode can be inserted reliably in the block without interference, the electrode base has a nominal diameter of 0.270 inches (0.689 cm) with a machining tolerance band of plus or minus 0.001 inches (0.003 cm). Accordingly, the electrode base can have a maximum diameter of 0.271 inches (0.688 cm) and a minimum diameter of 0.269 inches (0.683 cm). The diametral clearance between the base and bore can range between zero and 0.004 inches (0.010 cm) yielding a maximum radial displacement of the electrode relative to a centerline of the torch of 0.002 inches (0.005 cm). This maximum radial displacement is also called the worst case stacking error which results from employing a minimum allowable diameter electrode base with a maximum allowable diameter cathode block bore.

The worst stack error of the nozzle is added to that of the electrode to determine the combined total maximum radial displacement for the nozzle and electrode in the torch. Calculation of nozzle location error is similar to that of the electrode. For example, a torch body having a bore for receiving a base of the nozzle has a nominal diameter of 0.751 inches (1.908 cm) with a machining tolerance band of plus or minus 0.001 inches (0.003 cm). Accordingly, the bore can have a maximum diameter of 0.752 inches (1.910 cm) and a minimum diameter of 0.750 inches (1.905 cm). In order to ensure the nozzle can be inserted reliably in the body without interference, the nozzle base has a nominal diameter of 0.747 inches (1.897 cm) with a machining tolerance band of plus or minus 0.002 inches (0.005 cm). The larger tolerance band is attributable to the increased difficulty of machining larger diameter parts to close tolerances reliably at reasonable cost. Accordingly, the nozzle base can have a maximum diameter of 0.749 inches (1.902 cm) and a minimum diameter of 0.745 inches (1.892 cm). The diametral clearance between the base and bore can range between 0.001 inches (0.003 cm) and 0.007 inches (0.018 cm) yielding a maximum radial displacement of the nozzle relative to a centerline of the torch of 0.0035 inches (0.0089 cm).

The combined total maximum radial displacement of the nozzle relative to the electrode is the sum of the individual maximum radial displacements or 0.0055 inches (0.0140 cm). For a torch having an axial distance between a tip of the electrode insert and an entrance to the nozzle orifice of 0.140 inches (0.3556 cm), the angularity of the arc relative to the torch centerline may be calculated geometrically as about 2.25 degrees. Accordingly, if the axial distance from the tip of the insert to the workpiece surface is 0.274 inches (0.696 cm), the maximum dimensional error from the centerline of the torch projected on the workpiece to the actual entrance of a cut on the workpiece may be calculated geometrically as about 0.0108 inches (0.0274 cm). Depending on the direction of arc misalignment and the direction of the cut, the component cut from the workpiece may have cut edge angularity of 2.25 degrees and the dimensional error of the finished component may be up to twice the 0.0108 inches (0.0274 cm), or 0.0216 inches (0.0549 cm), in the case where opposite edges of the workpiece are both cut with the maximum skew. This magnitude of errors is unacceptable for reliably producing components and features therein having total dimensional tolerance of between about plus or minus 0.005 inches (0.013 cm) and about plus or minus 0.010 inches (0.025 cm). Further, for a small nominal diameter nozzle orifice such as 0.018 inches (0.046 cm), the combined maximum radial displacement of 0.0055 inches (0.0140 cm) and angularity of 2.25 degrees result in asymmetric wear of the nozzle entailing premature replacement.

Diametral tolerances of plus or minus 0.001 inches (0.003 cm) for each of an electrode base, cathode block bore, and torch body bore and plus or minus 0.002 inches (0.005 cm) for a nozzle base are necessary to ensure the capability to replace readily the consumable components in the field. While tighter tolerances could be employed, such practices typically would entail higher manufacturing costs and likely necessitate the use of special fixtures or tooling to remove and replace consumable electrodes and nozzles in the field. Attempts to rely on O-rings for sealing the radial clearances as well as centering are ineffective since there exists substantial inherent variation in the molded cross-sectional profile thereof.

Instead of using close tolerance sliding fits, the electrode and nozzle may be mounted on the cathode block and torch body, respectively, by means of screw threads. Based upon thread data tabulated in Machinery's Handbook, 24th Edition (Industrial Press, Inc. 1992), for an electrode and cathode block pair employing a 5⁄16-20 UN thread, the worst stack clearance based upon pitch diameter is 0.0104 inches (0.0264 cm) yielding a maximum radial displacement of the electrode centerline relative to the torch centerline of 0.0052 inches (0.0132 cm). For a nozzle and torch body employing a ¾-12 UN thread, the worst stack clearance based upon pitch diameter is 0.0144 inches (0.0366 cm) yielding a maximum radial displacement of the electrode centerline relative to the torch centerline of 0.0072 inches (0.0183 cm). Accordingly, the combined total maximum radial displacement is 0.0124 inches (0.0315 cm) yielding an angular error of 5.06 degrees and a dimensional error of 0.0242 inches (0.0615 cm) for a torch having similar axial dimensions as in the aforementioned example. While more precise threads could be employed, manufacturing costs would increase as well the difficulty associated with assembly and disassembly, especially since the threads are subject to surface degradation and thermal deformation in use.

Another method of providing axially concentric alignment of the electrode and nozzle involves the use of mating taper fits with the respective cathode block and torch body. While improved concentricity may be achieved, relative and absolute axial location of the electrode and nozzle suffer. In effect, tapers convert radial errors to axial errors. For example, for a nominal taper included angle of 30 degrees relative to torch centerline and a tolerance of plus or minus 30 minutes, the maximum axial displacement of an electrode relative to a cathode block is about 0.0047 inches (0.0120 cm).

Component axial accuracy is important for proper torch operation. For example, numerous elements are nested in the torch assembly, many of which are captured, such as the swirl ring disposed between the electrode and nozzle. Accordingly, it would be very difficult to ensure seating of both electrode and nozzle tapers while meeting the requisite axial stacking dimension of interdisposed components. Further, the relative distance between the electrode and the nozzle should be controlled within a narrow range. The distance therebetween should be large enough to provide for reliable pilot arc initiation, yet not so large as to exceed the breakdown voltage of the power supply in arc initiation mode. Additionally, and perhaps more importantly, the length of the transferred arc from the tip of the electrode at the insert to the workpiece should be closely controlled to achieve proper control of the power and proper processing of the workpiece. Changes in arc length effect arc voltage which in turn effects other critical processing parameters in the power supply.

Accordingly, there exists a need to improve upon the current state of the art by providing a low cost, readily manufacturable plasma arc torch assembly having a nozzle orifice concentrically axially aligned with an electrode insert, wherein the axial location of the electrode and nozzle can be closely controlled.

Within the last several years, AMP Incorporated, Harrisburg, Pa. 17105, a manufacturer of electrical connectors and associated hardware, has commercially marketed a product known as Louvertac™ in strip and preformed diameter band forms. Louvertac™ strip is employed to provide electrical current transfer between mating pins and sockets in electrical connectors. A female bridge formed type Louvertac™ band, part number 5-192047-3, having a current rating of 110 amperes has been employed in a plasma arc torch, being disposed between the base of an electrode and the cathode block to provide a reliable electrical connection therebetween. The band was retained in a circumferential groove along an inner surface of the cathode block bore. The Louvertac™ band functioned as intended, providing a current path between the cathode block and electrode, but produced an insubstantial cumulative radial load on the electrode; therefore, the band was substantially ineffective for reliably positioning the electrode relative to a centerline of the block or the torch. The torch is manufactured and sold by Hypertherm, Inc.

SUMMARY OF THE INVENTION

An improved plasma arc torch and method of achieving electrode insert and nozzle orifice alignment are disclosed, useful in a wide variety of applications including, but not limited to, computer controlled plasma arc torch systems for cutting and marking. In general, the invention may be applied to a torch where arc alignment relative to torch centerline is sought to be improved.

According to the invention, an electrode is disposed in a bore of a cathode block axially aligned along the centerline of a plasma arc torch. A nozzle is spaced from the electrode to provide a plasma chamber therebetween, the nozzle being supported within a bore of a circumscribing torch body. To align the nozzle orifice with the plasma arc torch centerline and therefore with the colinearly disposed electrode insert, a radial spring element is disposed in the bore between the torch body and nozzle. The symmetrical, radially inwardly disposed spring forces resiliently bias the nozzle along a circumferential surface thereof, centering the nozzle and orifice along the torch centerline. The spring element may be disposed in a circumferential groove formed in a bore of the body. Alternatively or additionally, the electrode may be supported in the cathode block bore by a second radial spring element disposed in a circumferential groove formed in the block bore.

Respective outer surfaces of the electrode and nozzle which react against the spring elements are sized to achieve the desired compressions in the springs and resultant centering forces. To facilitate insertion of the consumable electrode and nozzle while minimizing the potential for damage to the spring elements, the consumables may include a generous radius or reduced diameter end portion. The consumables also include a stop or other structure to ensure proper axial seating of the consumables in the torch and registration of the outer surfaces with respective spring elements. The spring elements may be manufactured from an electrically conductive material to provide a current path between the consumables and respective support structure.

According to the method of the invention, a torch assembly is provided including a cathode block and circumscribing torch body. The spring retention grooves and optionally the finish dimensions of the block and body bores are machined in a single fixture setup to ensure axial concentricity thereof and eliminate machining errors associated with multiple machining fixtures and setups. Thereafter, the springs and consumables are added to the torch assembly, yielding an electrode insert aligned with the nozzle orifice.

Several advantages may be realized by employing the structure and method according to the invention. For example, the electrode insert is aligned with the nozzle orifice so that the arc passes centrally therethrough and asymmetric wear of the orifice is markedly reduced or eliminated. Further, since arc location is repeatable and substantially collinear with the torch centerline, errors associated with variable arc position relative to a torch datum surface are substantially eliminated. When used in conjunction with a computer controlled torch positioning system, for example for cutting and marking applications, component dimensions and marking locations can be controlled within a smaller tolerance bandwidth than otherwise achievable using conventional torch configurations and assembly methods.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which.

DETAILED DESCRIPTION OF THE INVENTION

Figure 1:
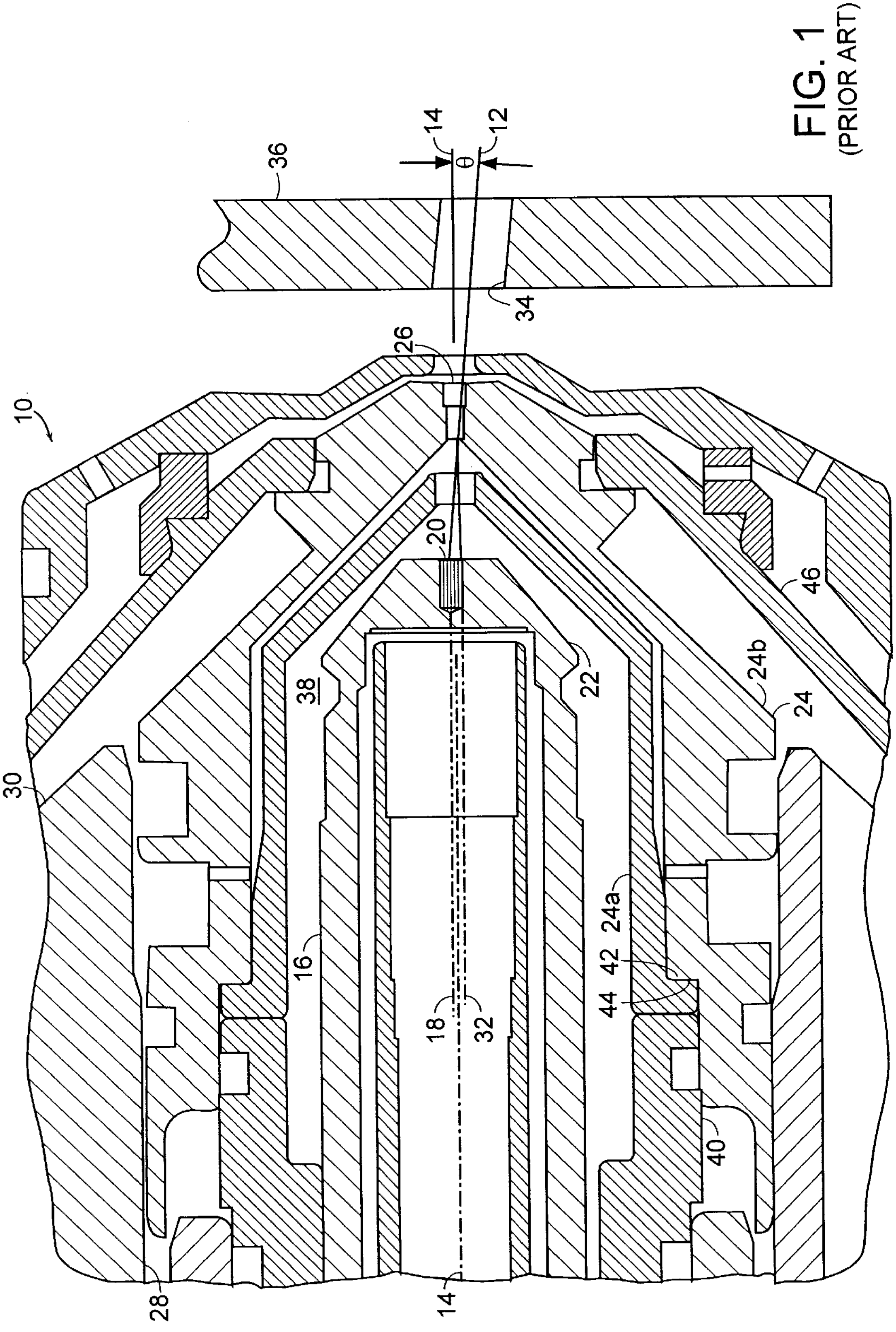
FIG. 1 (PRIOR ART)
FIG. 1 is a schematic sectional view of a working end of a prior art plasma art torch depicting misalignment of an arc path relative to torch centerline.

Depicted in FIG. 1 is a schematic sectional view of a working end of a prior art plasma art torch 10 depicting angular misalignment θ of an arc path 12 relative to a torch centerline 14. As discussed hereinabove with respect to the limitations inherent in conventional torches with close tolerance sliding fits, electrode 16 is mounted in a bore of a cathode block (not depicted) and includes an axial electrode centerline 18 passing through insert 20, disposed in a tip 22 of the electrode 16. Due to the radial clearance of the sliding fit between the electrode 16 and cathode block, the electrode centerline 18 is typically displaced radially from the torch centerline 14, depicted in FIG. 1 as being in an upward direction.

In this torch 10, a nozzle 24 includes a nozzle inner member or liner 24*a* disposed proximate the electrode 16 and a circumscribing nozzle outer member or shell 24*b* including orifice 26 through which the arc passes. The liner 24*a* is nested in the shell 24*b* which is disposed in a bore 28 of torch body 30. A plasma chamber 38 is formed in the annular volume defined by the electrode 16, nozzle 24, and a swirl ring 40. Due to the radial clearance of the sliding fit between the nozzle 24 and torch body 30, an axial nozzle centerline 32 is typically displaced radially from the torch centerline 14, depicted in FIG. 1 as being in an downward direction. This configuration depicts the worst case stack or maximum radial displacement error for the assembly. Accordingly, since the arc originates at a central location on the electrode insert 20 and passes through a center of the orifice 26, angular misalignment of the arc path 12 can be calculated geometrically given the axial dimension therebetween. The resulting kerf 34 produced in a workpiece 36 by the arc is both skewed and radially offset from a true position projection of the torch axis 14 on the workpiece 36. The maximum angular misalignment and radial offset are a function of the radial clearances between the electrode 16, nozzle 24, and respective bores of the block and body 30 in the assembly and the axial distance between the insert 20 and surface of the workpiece 36.

Figure 2:
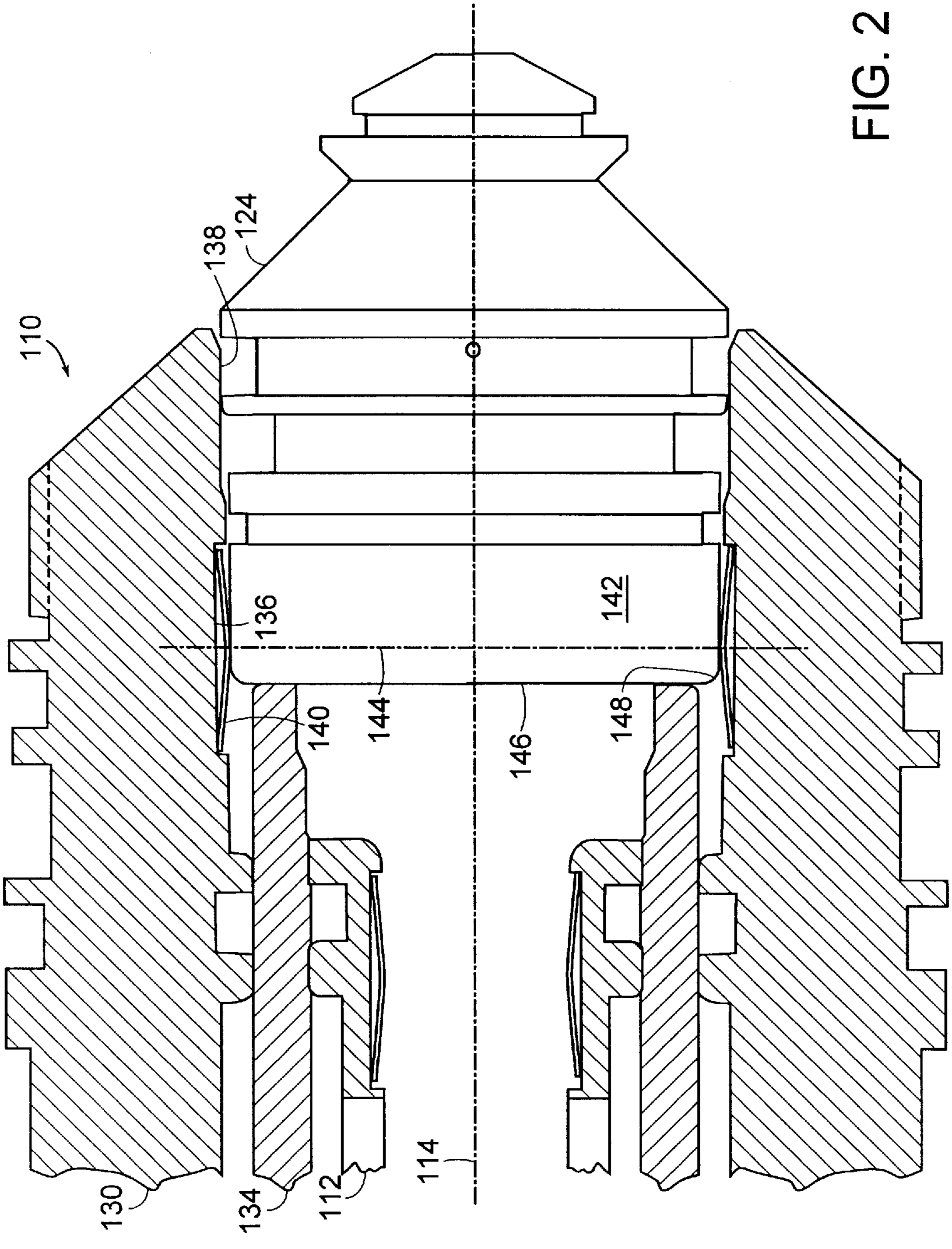
FIG. 2 is a schematic sectional view of a portion of plasma arc torch with a radially centered nozzle in accordance with an embodiment of the present invention.

By reducing the radial displacement of the electrode centerline 18 and nozzle centerline 32 relative to the torch centerline 14, both skew and radial offset of the arc path 12 can be minimized or substantially eliminated. FIG. 2 depicts a schematic sectional view of a portion of plasma arc torch 110 substantially similar to torch 10 but with a radially centered nozzle 124 in accordance with an embodiment of the present invention. The torch 110 includes a centrally disposed cathode block 112 configured to receive an electrode as will be discussed in greater detail hereinbelow with respect to FIG. 3. Circumscribing the block 112 is an insulator 134 which is circumscribed in turn by the torch body 130. The cathode block 112 and torch body 130 radially support the electrode and nozzle 124 in the torch 110 and typically also provide respective electrical connections thereto during pilot arc initiation.

A circumferential groove 136 is formed in an axial bore 138 of the body 130, for example, by machining. The groove 136 is sized to retain a radial spring element 140 therein having generally circular end bands and a plurality of radially inwardly bowed axial members as will be discussed in greater detail hereinbelow with respect to FIG. 4. The groove 136 is located axially such that an outer cylindrical surface 142 of the nozzle 124 reacts against the bowed members of the spring element 140 when installed in the torch 110. The outer surface 142 has a radial dimension less than that of the body bore 138 and greater than that of an installed nominal bore diameter of the spring element 140 formed by the bowed members prior to insertion of the nozzle 124. Accordingly, when the nozzle 124 is inserted, the spring element bowed members are displaced radially outwardly producing radial reaction forces against both the nozzle outer surface 142 and the torch body 130. The groove 136 is located axially in the body 130 so that when the nozzle 124 is installed, the outer surface 142 breaks a medial plane of the spring 140, shown generally at 144, to ensure that the desired compression of the spring element 140 has been achieved. In other words, the centrally disposed, minimum diameter portion of the spring element 140 reacts against the full diameter of the nozzle outer surface 142, thereby ensuring generation of radial reaction forces to center the nozzle 124 in the bore 138 and preclude generation of axial reaction forces which would tend to eject the nozzle 124 from the body 130. By providing substantially symmetrical radial forces due to the plurality of bowed members, the compressed spring element 140 centers the nozzle 124 in the bore 138, aligning the nozzle orifice with a centerline 114 of the torch 110. The spring element 140 is sufficiently stiff so as to reliably center the nozzle 124 in the torch 110 during torch operation when the nozzle 124 is subject to plasma gas flow and other dynamic loading resulting from movement of the torch 110.

Axial location of the nozzle 124 in the torch 110 is determined typically by an axial stop on the nozzle 124. Referring again to the torch 10 in FIG. 1, the nozzle liner 24*a* and shell 24*b* include a nesting flange 42 and ridge 44. The flange 42 acts as an axial stop for the nozzle 24, abutting swirl ring 40, when nozzle 24 is captured in the torch 10 by inner retaining cap 46 which typically threadedly engages the body 30. A similar axial stop configuration may be provided for nozzle 124 in torch 110, although any of a variety of alternate configurations may be employed. Whatever the configuration, the groove 136 is axially located to ensure the full diameter of the nozzle outer surface 142 breaks the medial plane 144 of the spring element 140 when the nozzle 124 is installed and seated.

To facilitate insertion of the nozzle 124 and compression of the spring element 140, an end 146 contiguous with the outer surface 142 may be of a reduced diameter or may include a generous edge radius 148 so that the end 146 has a minimum diameter equal to or less than about the installed nominal bore diameter of the spring element 140. The edge radius 148 may have a value of about 0.030 inches (0.076 cm) or more, preferably about 0.050 inches (0.127 cm) or more.

Figure 3:
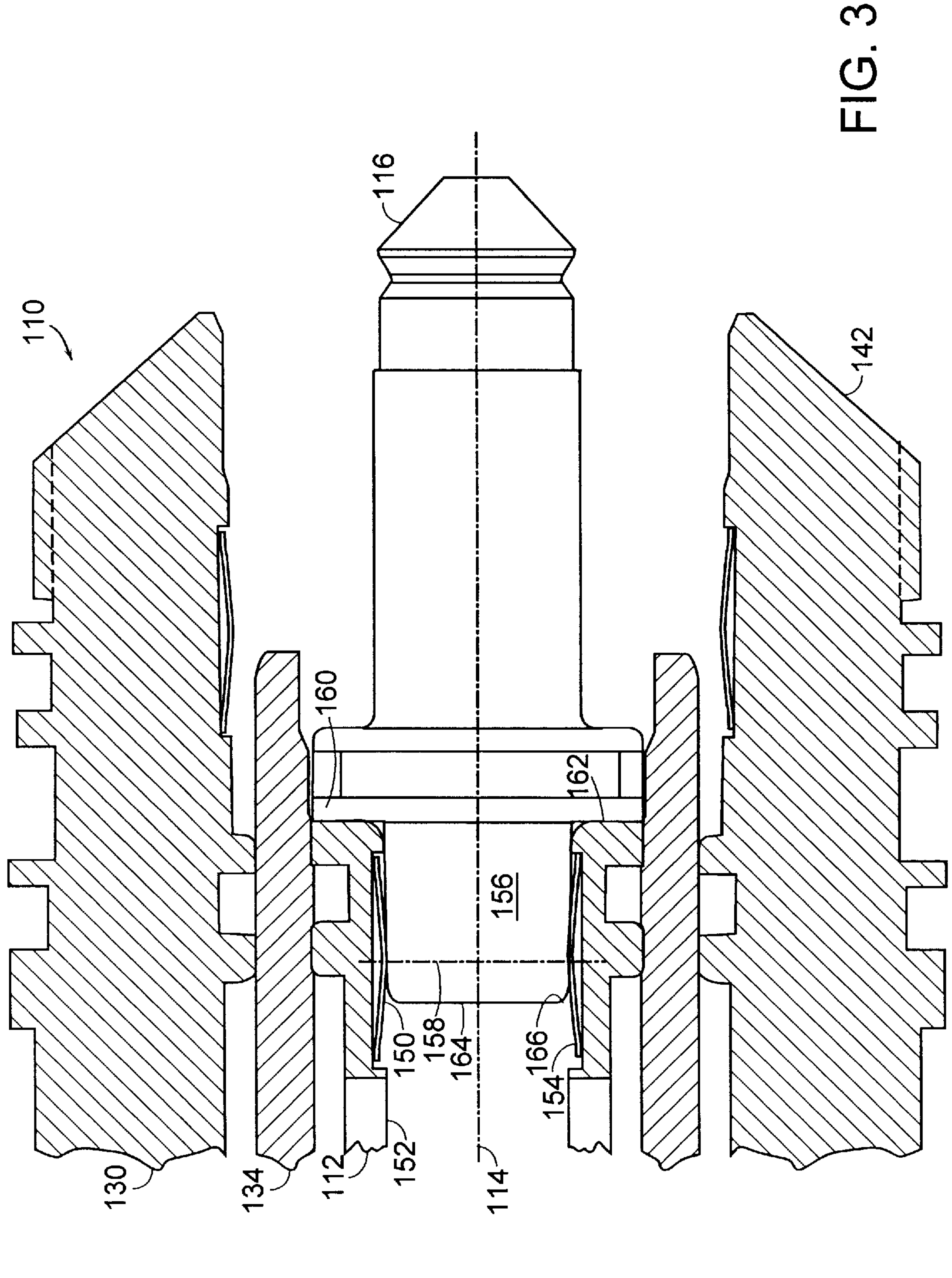
FIG. 3 is a schematic sectional view of the portion of the plasma arc torch depicted in FIG. 2 with a radially centered electrode and the nozzle removed for clarity in accordance with an embodiment of the present invention.

Merely by centering the nozzle 124 in the torch 110, about one half or more of the error associated with arc path skew and radial offset relative to torch centerline 114 can be dramatically reduced or eliminated. Accordingly, the torch 110 with the centered nozzle 124 could be used to produce components with less variability and tighter dimensional tolerances in a computer controlled cutting or marking system. Additional improvement may be realized however, by also centering an electrode in conjunction therewith. FIG. 3 shows torch 110 with an electrode 116 installed and the nozzle 124 removed for clarity.

The electrode 116 is supported radially in the torch 110 by the centrally disposed cathode block 112 which also provides electrical connection thereto during both pilot arc initiation and transferred arc operation. A circumferential groove 150 is formed in an axial bore 152 of the block 112, for example, by machining. The groove 150 is sized to retain a radial spring element 154 therein having generally circular end bands and a plurality of radially inwardly bowed axial member as will be discussed in greater detail hereinbelow with respect to FIG. 4. The groove 150 is located axially such that an outer cylindrical surface 156 of the electrode 116 reacts against the bowed members of the spring element 154 when installed in the torch 110. The outer surface 156 has a radial dimension less than that of the block bore 152 and greater than that of an installed nominal bore diameter of the spring element 154 formed by the bowed members prior to insertion of the electrode 116. Accordingly, when the electrode 116 is inserted, the spring element bowed members are displaced radially outwardly producing radial reaction forces against both the electrode outer surface 156 and the cathode block 112. The groove 150 is located axially in the block 112 so that when the electrode 116 is installed, the outer surface 156 breaks a medial plane of the spring 154, shown generally at 158, to ensure that the desired compression of the spring element 154 has been achieved. In other words, the centrally disposed, minimum diameter portion of the spring element 154 reacts against the full diameter of the electrode outer surface 156 thereby ensuring generation of radial reaction forces to center the electrode 116 in the bore 152 and preclude generation of axial reaction forces which would tend to eject the electrode 116 from the block 112. By providing substantially symmetrical radial forces, the compressed spring element 154 centers the electrode 116 in the bore 152 aligning the electrode insert with a centerline 114 of the torch 110. The spring element 154 should be sufficiently stiff so as to reliably center the electrode 116 in the torch 110 during torch operation when the electrode 116 is subject to plasma gas flow and other dynamic loading resulting from movement of the torch 110.

Axial location of the electrode 116 in the torch 110 is determined typically by an axial stop on the electrode 116. The electrode 116 includes a radially disposed flange 160 which abuts a radial face 162 of the cathode block 112. The flange 160 acts as an axial stop for the electrode 116 when inserted in the block 112. Typically, a swirl ring circumscribes the electrode 116 in the assembly which in turn axially locates a nozzle as discussed hereinabove with respect to FIGS. 1 and 2. The groove 150 is axially located to ensure the full diameter of the electrode outer surface 156 breaks the medial plane 158 of the spring element 154 when the electrode 116 is installed and seated.

To facilitate insertion of the electrode 116 and compression of the spring element 154, an end 164 contiguous with the outer surface 156 may be of a reduced diameter or may include a generous edge radius 166 so that the end 164 has a minimum diameter equal to or less than about the installed nominal bore diameter of the spring element 154. The edge radius 166 may have a value of about 0.030 inches (0.076 cm) or more, preferably about 0.050 inches (0.127 cm) or more.

By centering the electrode 116 in the torch 110, about one half or more of the error associated with arc path skew and radial offset relative to torch centerline 114 can be dramatically reduced or eliminated. By centering both the electrode 116 and the nozzle 124 in the torch 110, substantially all of the error can be eliminated, improving the capability of the torch 110 to produce components with less variability and tighter dimensional tolerances than if only one or neither of the consumables were centered.

Figure 4A:
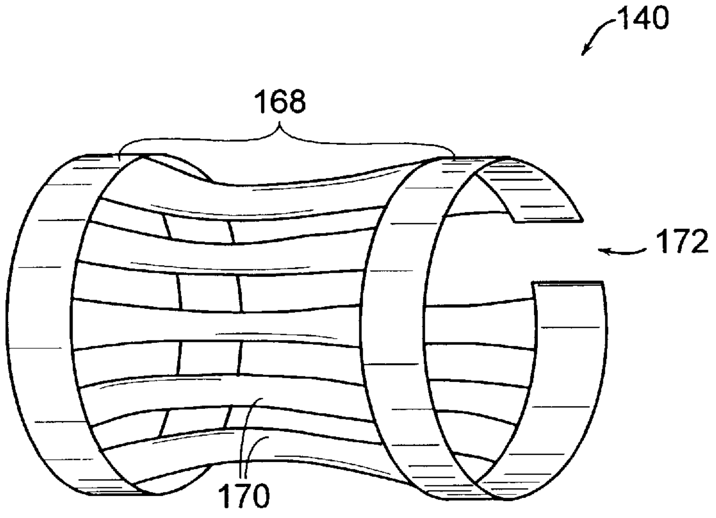
FIGS. 4A and 4B are perspective and end views, respectively, of an exemplary radial spring element useful for practicing an exemplary embodiment of the present invention.
Figure 4B:
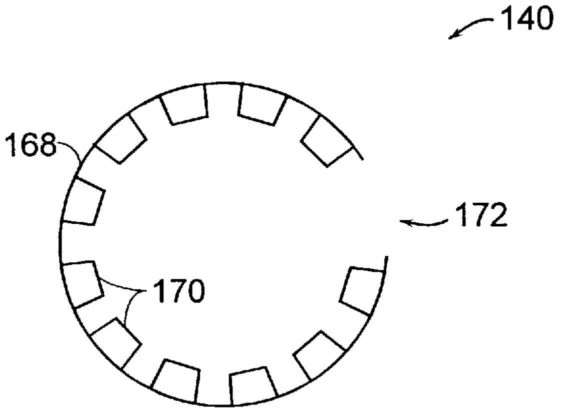

FIGS. 4A and 4B are perspective and end views, respectively, of an exemplary radial spring element 140 in an uninstalled free state. Radial spring elements 140 and 154 are substantially similar in configuration with spring element 140 having a larger installed diameter. The spring element 140 includes two circumferentially disposed end bands 168 and a plurality of closely spaced, axially extending, radially inwardly bowed members 170. In an exemplary embodiment, the spring element 140 is formed of unitary construction, for example by press forming and rolling a suitable elastically compliant material into a circular configuration. In a free state, the spring element 140 exhibits a gap 172 which is substantially eliminated when the spring element 140 is installed in an appropriately sized groove. Accordingly, in an installed state, the spring element 140 provides substantially uniform radial centering loading of a consumable element such as an electrode or nozzle disposed in a bore formed therein. The spring rate of the spring element 140 is a function of the length of the spring element 140 from end band 168 to end band 168, the thickness of the bowed members 170, and the material from which the spring element 140 is manufactured. The resultant cumulative radial force is a function of the spring rate and the radial compression of the bowed members 170 resulting from insertion of the outer surface in the bore thereof.

As discussed hereinabove, a female bridge formed type Louvertac™ band, part number 5-192047-3, employed in a Hypertherm torch to provide electrical contact between a cathode block and electrode. Rated for 110 amperes, the part has an overall length of 0.10 inches (0.25 cm) and a material thickness of 0.004 inches (0.010 cm). The part functioned as intended but did not contribute to the radial positioning of the electrode in the cathode block. Due in part to the thinness of the material, radial loading on the electrode was negligible, being about 2.2 pounds force, sufficient only to maintain contact between the bowed members and the electrode for electrical current transmission.

Testing of another Louvertac™ band, part number 2-192043-0, also rated for 110 amperes, provided the necessary current transmission function, but also unexpectedly provided a beneficial centering function as disclosed herein. This part has an overall length of 0.32 inches (0.81 cm), more than three times the prior part, and a material thickness of 0.006 inches (0.0152 cm), fifty percent greater than the prior part. The part imposed a cumulative radial load on the electrode of ten pounds force, taking into account the force contribution of each bowed member. It is contemplated that a threshold cumulative radial load of greater than about 2.2 pounds force would contribute to centering, with greater cumulative radial loads providing more reliable centering. A larger diameter Louvertac™ band can also be used in the centering of a nozzle with a nominal diameter of about 0.750 inches (1.905 cm) with similar beneficial results.

As may be readily appreciated by those skilled in the art, simply centering a nozzle 124 and an electrode 116 in respective bores 138, 152 of a torch body 130 and cathode block 112 would not necessarily align a nozzle orifice with an electrode insert. In general, two requirements must be met. First, the bores 138, 152 and spring element grooves 136, 150 formed therein need be substantially axially concentric. Second, the respective outer surfaces 142, 156 of the nozzle 124 and electrode 116 against which the spring elements 140, 154 react need be axially concentric respectively with the nozzle orifice and electrode insert.

In an exemplary embodiment, in order to make the bores 138, 152 and grooves 136, 150 axially concentric, a partial assembly of the torch 110 is provided including cathode block 112, insulator 134, and torch body 130. The bores 152, 138 may be already rough machined in the respective components or may be produced at this point by machining of the assembly, for example by drilling, milling, or turning processes. In order to provide sufficient clearance for machining, the assembly may include a radial spacer with a foreshortened axial length of the appropriate dimension instead of the insulator 134. To provide the desired concentricity, finish machining of the bores 138, 152 and grooves 136, 150 may be accomplished, advantageously, in a single machining setup. In other words, finish dimensions may be produced sequentially in the assembly without removing the assembly from the lathe chuck, milling fixture, or other machine tool apparatus. Concentricity of the finish bores 138, 152 and grooves 136, 150 may be measured conventionally with an indicator and should be within a tolerance band on the order of about 0.0005 inches (0.0013 cm) of total indicator runout.

The nozzle 124 and electrode 116 can be produced by conventional manufacturing methods such as turning and milling to produce the desired outer surface dimensions and concentricity to axial centerlines thereof. In an exemplary embodiment, electrode outer surface 156 will have a diametral dimension within a tolerance band of plus or minus 0.001 inches (0.003 cm) and nozzle outer surface 142 will have a diametral dimension within a tolerance band of plus or minus 0.002 inches (0.005 cm). Total indicator runout relative to an axis of the consumable passing through either the insert or orifice, as the case may be, is generally on the order of about 0.0005 inches (0.013 cm).

While there have been described herein what are to be considered exemplary and preferred embodiments of the present invention, other modifications of the invention will become apparent to those skilled in the art from the teachings herein. For example, the radial spring elements may be disposed in respective circumferential grooves formed in the electrode and nozzle for reaction against respective smooth bores of a cathode block and torch body. The particular methods of manufacture of discrete components and interconnections therebetween disclosed herein are exemplary in nature and not to be considered limiting. It is therefore desired to be secured in the appended claims all such modifications as fall within the spirit and scope of the invention. Accordingly, what is desired to be secured by Letters Patent is the invention as defined and differentiated in the following claims.

What is claimed is:

1. A plasma arc torch comprising:

first and second consumable components forming a plasma chamber therebetween in which an arc may be formed;

a torch body having an interior surface forming a circumferential groove and a bore in which said first component is disposed;

a first spring element disposed between said body interior surface and said first component in said body groove for providing radially directed forces therebetween to radially center said first component in said body bore;

a cathode block having an interior surface forming a circumferential groove and a bore in which said second component is disposed; and a second spring element disposed between said block interior surface and said second component in said block groove for providing radially directed forces therebetween to radially center said second component in said block bore, wherein said body bore and said block bore are substantially concentrically aligned thereby substantially concentrically aligning said first and second components.

2. The invention according to claim 1 wherein said first component is a nozzle and said second component is an electrode.

3. The invention according to claim 1 wherein said first and second spring elements are electrically conductive.

4. A plasma arc torch comprising:

an electrode and a nozzle forming a plasma chamber therebetween in which an arc may be formed;

a cathode block having an interior surface forming a circumferential groove and a bore in which said electrode is disposed;

a first spring element disposed between said block interior surface and said electrode in said block groove for providing radially directed forces therebetween to radially center said electrode in said block bore;

a torch body having an interior surface forming a circumferential groove and a bore in which said nozzle is disposed; and a second spring element disposed between said body interior surface and said nozzle in said body groove for providing radially directed forces therebetween to radially center said nozzle in said body bore, wherein said block bore and said body bore are substantially concentrically aligned thereby substantially concentrically aligning said electrode and said nozzle.

5. A method of concentrically axially aligning first and second consumable components which form a plasma chamber therebetween when installed in a plasma arc torch, the method comprising the steps of:

providing a torch assembly comprising first and second inner surfaces forming first and second generally axially concentric bores in which said first and second components are respectively disposed upon assembly of the torch;

generating a circumferential groove along each of said interior surfaces;

disposing a spring element in each of said grooves for providing radially directed forces between said grooved surfaces and said respective first and second components when disposed therein; and disposing said first and second components into respective first and second bores thereby compressing respective spring elements resulting in concentric axial alignment of said first and second components.

6. The invention according to claim 5 wherein said components comprise an electrode and a nozzle and wherein said inner surfaces comprise inner surfaces of a cathode block and a torch body.

7. The invention according to claim 6 wherein:

said electrode includes an outer surface concentrically axially aligned with a centerline of an insert disposed in a tip thereof;

said nozzle includes an outer surface concentrically axially aligned with a centerline of an orifice formed in a tip thereof; and wherein said respective outer surfaces compress said respective spring elements.

8. The invention according to claim 5 wherein said groove generating step comprises machining both grooves employing a single machining setup.

9. A nozzle for a plasma arc torch comprising:

an outer surface for reacting against a circumscribing radial spring element when installed in the torch, wherein said surface is radially dimensioned along an axial extent thereof to compress sufficiently said spring element to radially center said nozzle in the torch; and an end contiguous with said surface having a minimum diametral dimension equal to or less than about an installed nominal bore diameter of said spring element.

10. The invention according to claim 9 further comprising a stop located on said nozzle for registration of said axial extent relative to said spring element, wherein said spring element includes a medial plane and said stop abuts proximate structure when said axial extent has at least broken said medial plane.

11. The invention according to claim 9 further comprising an edge radius contiguous with said end or said surface having a value of at least about 0.030 inches.

12. An electrode for a plasma arc torch comprising:

an outer surface for reacting against a circumscribing radial spring element when installed in the torch, wherein said surface is radially dimensioned along an axial extent thereof to compress sufficiently said spring element to radially center said electrode in the torch; and an end contiguous with said surface having a minimum diametral dimension equal to or less than about an installed nominal bore diameter of said spring element.

13. The invention according to claim 12 further comprising a stop located on said electrode for registration of said axial extent relative to said spring element, wherein said spring element includes a medial plane and said stop abuts proximate structure when said axial extent has at least broken said medial plane.

14. The invention according to claim 13 further comprising an edge radius contiguous with said end or said surface having a value of at least about 0.030 inches.

* * * * *